United States Patent
Ackermann-Markes

(10) Patent No.: US 7,251,482 B2
(45) Date of Patent: Jul. 31, 2007

(54) METHOD FOR PROVIDING ABSENCE INFORMATION

(75) Inventor: Achim Ackermann-Markes, Wörthsee (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/529,403

(22) PCT Filed: Aug. 22, 2003

(86) PCT No.: PCT/DE03/02823

§ 371 (c)(1),
(2), (4) Date: Mar. 29, 2005

(87) PCT Pub. No.: WO2004/032467

PCT Pub. Date: Apr. 15, 2004

(65) Prior Publication Data
US 2006/0166654 A1    Jul. 27, 2006

(30) Foreign Application Priority Data
Sep. 30, 2002   (DE) ................................ 102 45 642

(51) Int. Cl.
H04M 3/42    (2006.01)
H04Q 7/22    (2006.01)
H04Q 7/38    (2006.01)

(52) U.S. Cl. ............................................ 455/414.1

(58) Field of Classification Search ............. 455/414.1
See application file for complete search history.

(56) References Cited

U.S. PATENT DOCUMENTS

2002/0078150 A1    6/2002   Thompson et al.

FOREIGN PATENT DOCUMENTS

EP    1 217 849 A1    6/2002

*Primary Examiner*—William D. Cumming

(57) ABSTRACT

A method for providing absence information in a telecommunication system comprising several subscribers, wherein the absence information is produced and captured by a first subscriber terminal. The presence information is transmitted to a switching node and stored therein. The switching node transmits the absence information to a second subscriber terminal such that the absence information is continuously available. Known absence text and station guarding services are used to produce and store absence information.

19 Claims, 2 Drawing Sheets

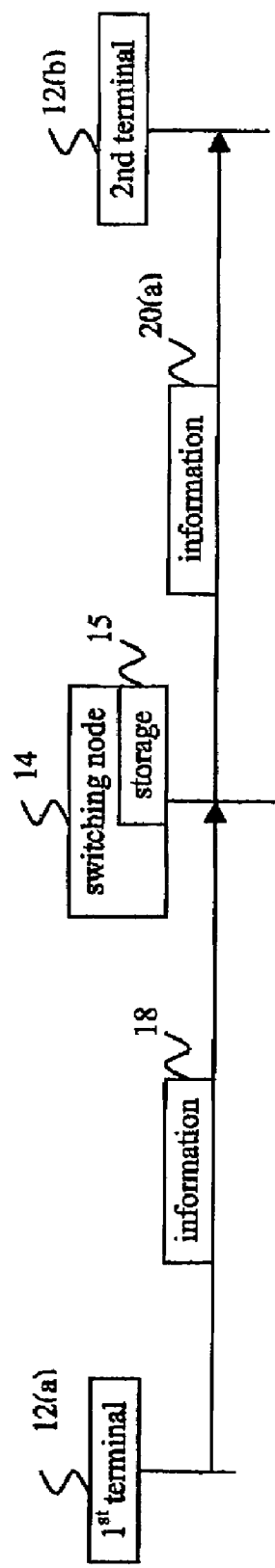
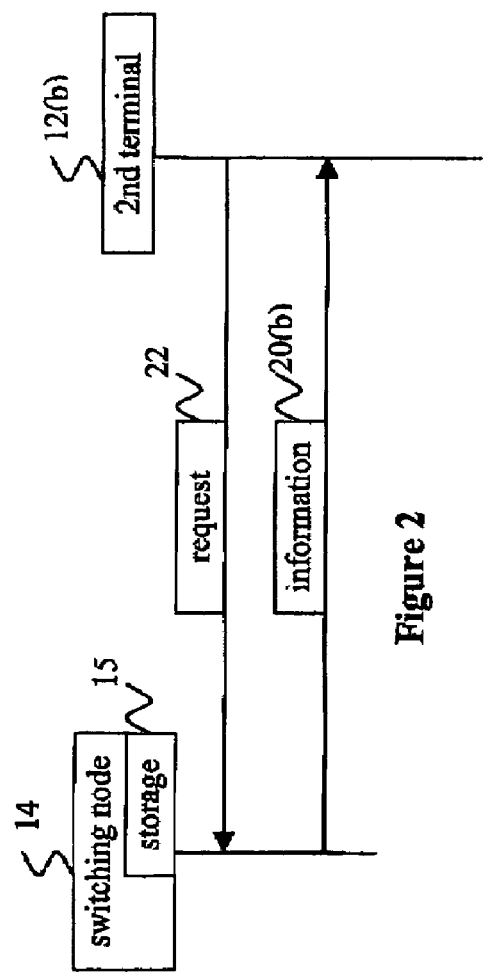

METHOD FOR PROVIDING ABSENCE INFORMATION

CROSS REFERENCE TO RELATED APPLICATIONS

This application is the US National Stage of International Application No. PCT/DE2003/002823, filed Aug. 22, 2003 and claims the benefit thereof. The International Application claims the benefits of German application No. 10245642.9 filed Sep. 30, 2002, both applications are incorporated by reference herein in their entirety.

FIELD OF THE INVENTION

The invention relates to a method for providing absence information in a telecommunication system having a plurality of subscribers.

BACKGROUND OF THE INVENTION

In addition to the conventional telephony service features, modern forms of communication such as "Instant Messaging" and "Presence" are becoming increasingly important. In particular, the younger generation is already used to working with these forms of communication today, and it is to be assumed that they will also want to use these forms of communication in the working environment. This is supported by some firms, for example, which are moving toward this environment by using the IP convergence products.

In telecommunication systems, one subscriber learns of the absence of another as a result of the fact that the other subscriber does not accept the connection when a connection setup is attempted and, if an absence text has been defined, as a result of the fact that the calling subscriber receives this text message. If the called subscriber is already having a conversation at that time, this is signaled to the caller by means of the busy tone.

However, the caller only receives this information if said caller calls, i.e. dials the called party. The purpose of a "presence service" is to provide a subscriber with absence information or information about the availability of other subscribers directly, without the need to actually contact these other subscribers. This information can be, for example: Present, Away on vacation, Do not disturb, At lunch, etc.

Such presence services already exist for the internet data medium. The information is displayed to the subscriber in a subscriber list, i.e. a so-called buddy list. These buddy lists are a personal list of one or more personally selected subscribers whose presence status one wishes to track. In particular, they provide information about whether a selected person is currently "online", i.e. available.

Status information for every subscriber is already stored in many telecommunication systems or PBX systems today using the absence text and station guarding service features. This information is currently provided to the terminals when a call is made.

For example, a subscriber can have activated the standard absence text "Away on vacation until June. 20".

If a call to this subscriber is then made by another subscriber who is connected to the same telecommunication system, the text message is sent to the calling subscriber and displayed in the display of the caller.

SUMMARY OF THE INVENTION

The present invention therefore addresses the problem of specifying a method for providing absence information in a telecommunication system, whereby a subscriber can be continuously informed of the contactability of further subscribers, and can provide their own availability status to other subscribers.

This problem is solved by the claims.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit the invention. The drawings contain the following figures, in which like numbers refer to like parts throughout the description and drawings wherein:

FIG. 1 illustrates an exemplary schematic diagram according to one aspect of the present invention;

FIG. 2 illustrates an exemplary schematic diagram according to another aspect of the present invention.

DETAILED DESCRIPTION OF INVENTION

Figure 3:
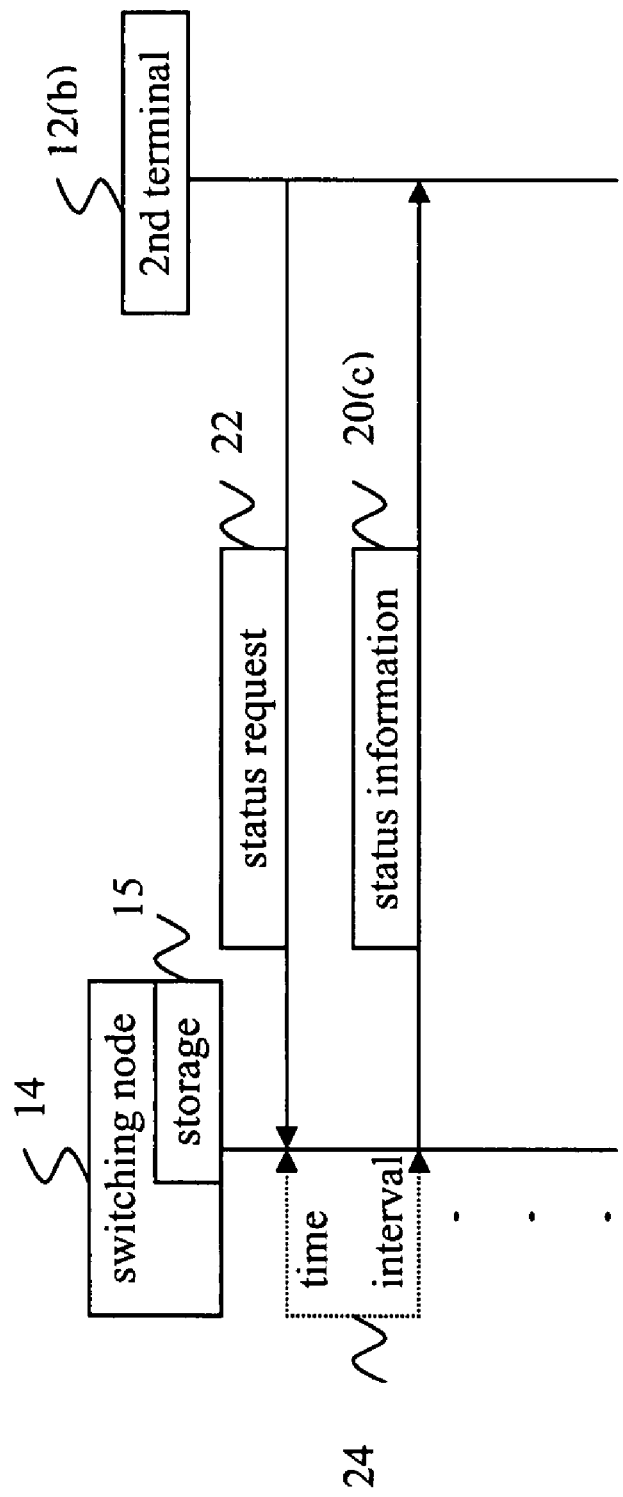
FIG. 3 illustrates an exemplary schematic diagram according to yet another aspect of the present invention.

Essential to the invention is the idea that status information (particularly absence information) is produced and captured at a first terminal 12(*a*), said terminal being assigned to a first subscriber. This information 18 is then transferred to a switching node 14 of a telecommunication system and stored there. The switching node 14 then transfers the information 20(*a*) to a second terminal 12(*b*), which may be in the same telecommunication system and which is assigned to a second subscriber, such that the absence information is then available at the second terminal 12(*b*). In this way the second subscriber has the status of the first subscriber ready at all times. It is advantageous not only to integrate these novel communication paradigms into future IP products, but also to provide this functionality in the existing product environment (IP convergence). This in turn ensures that the existing investment of the customer retains its value (investment protection).

In an advantageous embodiment of the claimed method, the second terminal 12(*b*) sends a request message 22 to the switching node 14. Following receipt of this request message 22, the switching node 14 sends the current absence information 20(*b*) relating to the first subscriber to the second terminal 12(*b*). In this way the information which is available at the second terminal 12(*b*) can be updated as required.

Alternatively, in a further appropriate embodiment, the second terminal 12(*b*) again sends the request message 22 to the switching node 14 but, after receiving the request message 22, the switching node 14 sends current absence information 20(*c*). about the first subscriber at specified time intervals 24. As a result, the information which is available at the second terminal 12(*b*) is regularly updated and renewed.

As a further alternative, the second terminal 12(*b*) again sends a request message 22 to the switching node 14 but, after receiving the request message 22, the switching node 14 only sends current absence information 20 about the first subscriber to the second terminal 12(*b*) in each case if said absence information has changed. In this way the information which is available at the second terminal 12(b) is only updated and renewed if a change has occurred. No data transmission takes place if the absence information remains the same, thereby allowing a reduction in the amount of data that must be transmitted.

In a further advantageous embodiment of the claimed method, said embodiment being particularly convenient for the user, the absence information about the first subscriber is automatically captured at the first terminal 12(a). The capture of the presence can take place in a simple way by establishing whether the terminal is switched on or off. Alternatively, the capture of the presence is conceivable inter alia by means of a sensor, e.g. a movement indicator at the workstation. Additionally, the vacation information can be made available to the switching node 14 by the personnel department.

The available absence information is usefully displayed on a display of the second terminal 12(b). This can be the display of a telecommunication terminal or telephone or a monitor of a computer, for example, or the absence information can also take the form of a voice message (text-to-speech) if the second terminal 12(b) does not have a display, for example. For the representation provided by a telephone display having one or two lines, alphanumeric characters and standard symbols can be used. For the representation on a computer monitor, the information can be arranged more attractively using graphical means, small pictures and the like.

In an advantageous embodiment of the claimed method, the absence information about the first subscriber is stored 15 in the second terminal 12(b) or in a switching node 14 or in another suitable device. The information is therefore still available if something else has been displayed on the display in the meanwhile, e.g. the locally selected telephone number of a desired called party.

In an embodiment of the claimed method, facilities of the telecommunication system e.g. the "absence text" and "station guarding" service features are preferably used when producing and storing the absence information. As a result, it is possible to continue using the hardware of existing systems which offer these known service features.

In an appropriate embodiment, a plurality of first terminals send the relevant absence information 18 to the second terminal 12(b). In this way, a subscriber list which includes the corresponding first subscribers can be defined at the second terminal 12(b). The second subscriber can therefore specify a selection of other subscribers whose absence information said second subscriber wishes to have. Moreover, the first terminal 12(a) preferably sends the absence information to a plurality of second terminals 12(b).

In a particularly advantageous embodiment of the claimed method, absence information relating to at least one external subscriber is additionally provided. The external subscriber, having a terminal which is assigned to said external subscriber, is not assigned to the telecommunication system. Instead, the external terminal is connected to the telecommunication system via a network or data network, e.g. the internet, via a LAN (local area network) or any other suitable network. It is highly attractive for users not only to track the presence status of subscribers on the same system but also to track the presence status of external subscribers who can be reached worldwide via the whole internet and, if so desired, to publish their own presence status via this external service.

A preferred embodiment of the claimed method uses a first assignment table in order to transform the absence information relating to the external subscriber from an absence information format of the external terminal into an absence information format of the telecommunication system.

Furthermore, a second assignment table is used in order to transform absence information in the opposite direction, i.e. from the absence information format of the telecommunication system into an absence information format of the external terminal. The exchange of information across system boundaries, i.e. the synchronization of the terminals, is therefore possible.

In an advantageous embodiment of the claimed method, standard protocols such as the Session Initiation Protocol (SIP), for example, are used for sending the absence information between terminals of a PBX and external terminals. In this way the platform-independent exchange of the absence information is possible. In this embodiment the terminal 12(b) of FIG. 1 may correspond to an external terminal with the switching 2 node 14 corresponding to a PBX connected to transfer the information 20(a) to the second terminal 12(b) via a data network such as the Internet or a LAN.

The use of the claimed method is particularly advantageous in a telecommunication system which has the "absence text" and "station guarding" service features. In this way it is possible to provide an absence information service or "presence service", said service being available both to IP endpoints such as IP PC clients and IP telephones and to conventional system telephones and future terminals and applications, using existing service features of a traditional or known telecommunication system.

Further advantages and functionalities are derived from the dependent claims and from the following description of a preferred exemplary embodiment.

The embodiment that is proposed below is represented with reference to the example of a communication system, wherein the "absence text" service feature is described first. In this system, each subscriber having a display can activate an absence text which is configured in the system.

If a subscriber who has activated such a text is called, the corresponding absence text appears in the display of the caller. The texts can include variable parameters, wherein the parameters (e.g. time of day) are entered during the activation. The numeric keypad of the terminal is available for entering the additional characters.

The system has a specific number of absence texts, e.g. ten. In this case the maximum permitted character length of the absence text is 24 characters, for example. It is also possible to enter and send an individual text.

The "station guarding" (DND) service feature is discussed below, wherein each terminal station can activate station guarding for itself by means of a procedure. As a result of this service feature, incoming calls for this terminal station are not put through.

The claimed method uses the two service features which are introduced above for solving the problem. The "presence service" is firstly explained with reference to the provision of absence information. If this absence information is made continuously available, and not just in the event of a call, this presence status information can be used for implementing a presence service. By analyzing the information in the absence texts and the station guarding status, the client can analyze the presence status information for its personal "buddy list" and also set its own "presence status". This analysis or setting of the presence status information is done using the existing station guarding or absence text service features.

The client reports the status information both as an icon, e.g. using a palm tree for "Away on vacation", and as a text providing further information when the mouse is moved over a "buddy", for example, e.g. "Away on vacation until: Jun. 20, 2002".

The following table shows the possible statuses and how they are displayed on the PC client in each case:

| Status number | Status Remote station | Status information | Display on client |
|---|---|---|---|
| 1 | No status information available | None | No dot<br>Color icon person |
| 2 | No status information set, subscriber free | Online, free | Green dot<br>Color icon person |
| 3 | No status information set, subscriber busy | Online, busy | Red<br>Color icon person |
| 4 | No status information set, subscriber not registered | Offline | Gray dot<br>Gray icon person |
| 5 | Station guarding on | Online/offline + status | Yellow/gray dot<br>Color icon person<br>E.g. "Do not disturb" displayed if mouse moved over icon |
| 6 | Absence texts On | | |
| 7 | 0) Back at: | Online, offline + status | Yellow/gray dot<br>Color icon clock<br>Return time displayed if mouse moved over icon |
| 8 | 1) Away on vacation until: | Online, offline<br>1) Away on vacation until: | Red/gray dot<br>Color palm tree<br>Date displayed if mouse moved over icon |
| 9 | 2) Away on business until: | Online, offline<br>2) Away on business until: | Yellow/gray dot<br>Color icon, car/train/airplane<br>Date displayed if mouse moved over icon |
| 10 | 3) Out all day | Online, offline<br>3) Out all day | Yellow/gray dot<br>Color icon person<br>E.g. "Back tomorrow" displayed if mouse moved over icon |
| 11 | 4) Out to lunch | Online, offline<br>4) Out to lunch | Yellow dot<br>Color icon coffee cup<br>"Break" displayed if mouse moved over icon |
| 12 | 5) Unavailable | Online, offline<br>5) Unavailable | Red/gray dot<br>Gray icon of a person<br>E.g. "Unavailable" displayed if mouse moved over icon |
| 13 | 6) Private tel. | Online, offline<br>6) Private tel. | Yellow/gray dot<br>Color icon person<br>Telephone number displayed if mouse moved over icon |
| 14 | 7) Deputy | Online, offline<br>7) Deputy | Yellow/gray dot<br>Color icon person<br>Telephone number and name of deputy displayed if mouse moved over icon |
| 15 | 8) At present | Online, offline<br>8) At present | Yellow/gray dot<br>Color representation person<br>Free text displayed if mouse moved over icon |
| 16 | 9) In room: | Online, offline<br>9) In room: | Yellow/gray dot<br>Color representation person<br>Room number/name displayed if mouse moved over icon |
| 17 | 10) Other text | Online, offline<br>10) Other text | Green dot<br>Color icon person with exclamation mark<br>Text displayed if mouse moved over icon |

The absence information is produced at the terminal. In this way the local status can be configured easily via a window or menus. If statuses require a further input, it should be possible to enter this as an option. A list of possible statuses, together with their names and a corresponding input field, is shown below:

| | Menu: File/My status | |
|---|---|---|
| Checkbox: | Status name | Input field |
| ⊗ | Vacation: | 06/30/2002 |
| ○ | Back at: | |
| ○ | Away on business until: | |
| ○ | Etc. | |

The client must use these inputs again in order to set the traditional "station guarding" or "absence text" service feature accordingly. This ensures that desktop telephones featuring a 2-line display can use this functionality in a conventional manner without modification. In the case of future telephones having a larger display, the same "buddy lists" can be viewed on the display in the same way as at the client.

The presence services offer interfaces for external programs in order to set and exchange presence status information. These are proprietary interfaces in some cases, and in some cases standard protocols such as e.g. SIP (Session Initiation Protocol) are used in order to exchange status information. These interfaces must be used by the PC client or the telephone. This is possible in the case of the aforementioned SIP protocol, for example.

A synchronization of the tables for any format can be performed by means of an assignment table showing the absence information in the relevant formats. The assignment is explained with reference to the example of presence status information coming from a telecommunication system and from a software messenger for internet applications, but can also be used analogously for other presence services and other telecommunication systems, having been modified accordingly.

The following table shows the synchronization in the telecommunication system to messenger direction:

| Status number | Status information Telecommunication system | Status Messenger |
|---|---|---|
| 1 | None | Display as offline |
| 2 | Online, free | Online |
| 3 | Online, busy | On the phone |
| 4 | Offline | Display as offline |
| 5 | Online/offline + Status station guarding on | Occupied |
| 6 | | |
| 7 | Online, offline + Status<br>0) Back at: | Back soon |

-continued

| Status number | Status information Telecommunication system | Status Messenger |
|---|---|---|
| 8 | Online, offline 1) Away on vacation until: | Absent |
| 9 | Online, offline 2) Away on business until: | Absent |
| 10 | Online, offline 3) Out all day | Absent |
| 11 | Online, offline 4) Out to lunch | Lunch break |
| 12 | Online, offline 5) Unavailable | Absent |
| 13 | Online, offline 6) Private tel. | Online |
| 14 | Online, offline 7) Deputy | Absent |
| 15 | Online, offline 8) At present | Online |
| 16 | Online, offline 9) In room: | Online |
| 17 | Online, offline 10) Other text | Online |

The following table shows the opposite direction, i.e. the synchronization in the messenger to telecommunication system direction:

| Status number | Status presence Messenger | Status information Telecommunication system |
|---|---|---|
| 1 | Show as offline | None |
| 2 | Online | Online, free |
| 3 | On the phone | Online, busy |
| 5 | Occupied | Online/offline + Status station guarding on |
| 7 | Back soon | Online, offline + Status 0) Back at, without time information |
| 10 | Absent | Online, offline 3) Out all day |
| 11 | Lunch break | Online, offline 4) Out to lunch |

As shown in the above tables, a small loss of data information can arise when synchronizing the absence information between two different information formats. Since the messenger only allows a small number of status designations, it is not possible to specify different information on a display of a terminal of the telecommunication system, according to whether the subscriber is on vacation, on a business trip, out all day, unavailable, or has specified a deputy. All of the aforementioned statuses are represented as out all day.

It is clear that the completeness and accuracy of the absence information which is transferred or transformed is dependent on the completeness of the table having the smaller number of statuses. This current restriction will be avoided in the future by a general standard which has yet to be developed for the exchange of absence information.

All of the features which are disclosed in the application are claimed as essential for the invention in so far as they are novel, individually or in combination, over the prior art.

The invention claimed is:

1. A method for providing absence information for a telecommunication subscriber, the method comprising:
creating and acquiring the absence information regarding a first subscriber terminal;
sending the absence information regarding the first subscriber terminal to a switching node and storing the absence information in the switching node; and
sending the absence information regarding the first subscriber terminal to a second subscriber terminal, such that the absence information is continuously available at the second terminal, wherein
absence text and station guarding service features are used when creating and storing the absence information.

2. The method as claimed in claim 1, further comprising:
sending a request message to the switching node by the second terminal; and, after receiving the request message,
sending current absence information regarding the first subscriber terminal to the second terminal by the switching node.

3. The method as claimed in claim 1, further comprising:
sending a request message to the switching node by the second terminal; and, after receiving the request message,
sending current absence information regarding the first subscriber terminal to the second terminal by the switching node at specified time intervals.

4. The method as claimed in claim 1, further comprising:
sending a request message to the switching node by the second terminal; and, after receiving the request message;
sending the absence information regarding the first subscriber terminal to the second terminal by the switching node if the absence information has changed.

5. The method as claimed in claim 1, wherein the absence information regarding the first subscriber terminal is automatically acquired at the second terminal.

6. The method as claimed in claim 2, wherein the absence information regarding the first subscriber terminal is automatically acquired at the second terminal.

7. The method as claimed in claim 3, wherein the absence information regarding the first subscriber terminal is automalically acquired at the second terminal.

8. The method as claimed in claim 4, wherein the absence information regarding the first subscriber is automatically acquired at the second terminal.

9. The method as claimed in claim 1, wherein the absence information which has been sent is displayed at the second terminal.

10. The method as claimed in claim 1, wherein the absence information is regularly undated at the second terminal.

11. The method as claimed in claim 1, wherein further service features are used for creating and storing the absence information.

12. The method as claimed in claim 1, wherein the switching node includes storage for subscriber list from which absence information is sent to the second terminal.

13. The method as claimed in claim 1, wherein the switching node sends the absence information to one second terminal.

14. The method as claimed in claim 1, wherein the second terminal is an external terminal relative to the first subscriber terminal, having a network connection to the switching node.

15. The method as claimed in claim 14, wherein the network connection includes the Internet.

16. The method as claimed in claim 14, wherein a first assignment table is used for transforming the absence information regarding the external terminal from an absence information format of the external terminal into an absence information format of the switching node.

17. The method as claimed in claim 14, wherein a second assignment table is used for transforming the absence information from the absence information format of the switching node into the absence information format of the external terminal.

18. The method as claimed in claim 14, wherein standard protocols are used for sending the absence information between the first and second terminals.

19. The method as claimed in claim 18, wherein the Session Initiation Protocol (SIP) is used as a standard protocol for sending the absence information between the terminals.

* * * * *